(12) United States Patent
Weitzel et al.

(10) Patent No.: US 8,217,109 B2
(45) Date of Patent: Jul. 10, 2012

(54) PROTECTIVE-COLLOID-STABILIZED POLYMERS IN THE FORM OF THEIR AQUEOUS DISPERSIONS OR OF THEIR WATER-REDISPERSIBLE POWDERS

(75) Inventors: Hans-Peter Weitzel, Reischach (DE); Kurt Stark, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 2250 days.

(21) Appl. No.: 10/692,887

(22) Filed: Oct. 24, 2003

(65) Prior Publication Data

US 2004/0097645 A1 May 20, 2004

(30) Foreign Application Priority Data

Nov. 14, 2002 (DE) ................................ 102 53 046

(51) Int. Cl.
*C08J 3/12* (2006.01)
*C08J 3/05* (2006.01)
(52) U.S. Cl. ............... 524/459; 524/577; 526/202
(58) Field of Classification Search .................. 524/459, 524/557, 577; 526/202
See application file for complete search history.

(56) References Cited

U.S. PATENT DOCUMENTS

| 6,001,903 | A | * | 12/1999 | Nakamae et al. | ........... | 524/3 |
| 6,300,403 | B1 | * | 10/2001 | Mayer et al. | ........... | 524/459 |
| 6,348,532 | B1 | | 2/2002 | Mayer | | |
| 6,667,352 | B1 | | 12/2003 | Kusters et al. | | |
| 2001/0025078 | A1 | * | 9/2001 | Mayer et al. | ........... | 524/459 |

FOREIGN PATENT DOCUMENTS

| CA | 2 311 805 | | 6/2000 |
| DE | 199 28 933 A1 | | 12/2000 |
| EP | 0 692 494 A1 | | 1/1996 |
| EP | 0 834 520 A2 | | 3/1998 |
| EP | 1 065 224 A1 | | 1/2001 |
| EP | 1065224 | * | 1/2001 |
| EP | 1 088 835 | | 4/2001 |
| EP | 1 088 835 A1 | | 4/2001 |
| EP | 1 110 978 A1 | | 6/2001 |
| EP | 1 110 979 A1 | | 6/2001 |
| EP | 1110978 | * | 6/2001 |
| EP | 1 400 557 A1 | | 3/2004 |
| EP | 1 420 033 B1 | | 8/2004 |
| JP | 6-80709 | | 3/1994 |
| JP | 11263849 A | | 9/1999 |
| JP | 200148990 A | | 2/2001 |
| JP | 2002-269600 | | 9/2002 |
| JP | 2002-269602 | | 9/2002 |
| JP | 2002530495 A | | 9/2002 |
| WO | WO 99/16794 | | 4/1999 |

OTHER PUBLICATIONS

Derwent Abstract corresp. to EP 1 065 224 [AN 2001-148205].
Derwent Abstract corresp. to EP 1 110 978 [AN 2001-559057].
Derwent Abstract corresp. to EP 1 110 979 [AN 2001-515952].
Derwent Abstract corresp. to WO-A 99/16794 [AN 1999-255060].
Derwent Abstract corresp. to EP 0 834 520 [AN 1998-195437].
T.G. Fox, Bull. Am. Physics, Soc. 1, 3, pp. 123 [1956].
Polymer Handbook 2nd Edition, J. Wiley & Sons, New York [1975].
Derwent Abstract corresponding to DE 199 28 933 [AN 2001-148205].
English translation corres. to JP 6-80709.
English translation corres. to JP 2002-269600.
English translation corres. to JP 2002-269602.
Derwent Abstract corres. to EP 11 109 78 [AN 2001-515952].

* cited by examiner

*Primary Examiner* — Kelechi Egwim
(74) *Attorney, Agent, or Firm* — Brooks Kushman P.C.

(57) ABSTRACT

Protective-colloid-stabilized polymers in the form of their aqueous dispersions or of their water-redispersible powders are based on homo- or copolymers of one or more monomers from the group consisting of vinyl esters of optionally branched alkyl carboxylic acids having from 1 to 15 carbon atoms, (meth)acrylic esters of alcohols having from 1 to 15 carbon atoms, vinylaromatics, olefins, dienes, and vinyl halides, wherein partially hydrolyzed vinyl acetate-ethylene copolymers with an ethylene content of from 1 to 15 mol %, a degree of hydrolysis DH of the vinyl acetate units of 80 mol %<DH<95 mol %, and a Höppler viscosity in 4% by weight aqueous solution of from 2 to 30 mPas, are present as protective colloids.

15 Claims, No Drawings

PROTECTIVE-COLLOID-STABILIZED POLYMERS IN THE FORM OF THEIR AQUEOUS DISPERSIONS OR OF THEIR WATER-REDISPERSIBLE POWDERS

BACKGROUND OF THE INVENTION

1. Field of the Invention

The invention relates to protective-colloid-stabilized polymers in the form of their aqueous dispersions or in the form of their water-redispersible powders, to a process for preparing these polymers by emulsion polymerization, and to the use of these polymers.

2. Background Art

Protective-colloid-stabilized polymers are used especially in the form of their aqueous dispersions or of their water-redispersible polymer powders in a wide variety of applications, for example as coating compositions or in adhesives for a corresponding variety of substrates, e.g. as cementitious tile adhesives. The protective colloids generally comprise polyvinyl alcohols. The use of polyvinyl alcohol is desired because the polyvinyl alcohol itself contributes to strength, for example to tensile bond strength in tile adhesives, whereas this is not the case in systems stabilized by low-molecular-weight compounds (emulsifiers). Monomers preferably used hitherto for the preparation of redispersible powders are vinyl esters and ethylene, due to the fact that stabilization of acrylate copolymers, styrene-acrylate copolymers, and styrene butadiene copolymers is much more difficult to achieve by polyvinyl alcohols.

One disadvantage of the use of polyvinyl alcohol is that this protective colloid gives the resultant products low water resistance. Problems can arise not only during preparation but also during the use of the desired products. In particular, when polymers in the form of their redispersion powders are used to improve mortar properties, a primary application sector of redispersion powders, the formulations have to remain stable over a certain time, and must suffer no significant alteration in their usage consistency (viscosity stability or cement stability), because the user should not expect to have to make another mix after only a short period. In the concrete and mortar industry, furthermore, mechanical properties such as compressive strength and porosity and the associated air-pore content play an important part. If too many air pores are present, compressive strength falls markedly, while if too few, or no, air pores are present in the mortar or concrete, the construction material lacks adequate resistance to freeze-and-thaw cycles. In addition, the hydraulically setting systems whose quality has been improved by the dispersion powder are intended to provide even better adhesion than systems whose quality has not been thus improved.

Although polyvinyl alcohol-stabilized powders have good viscosity properties and processing properties in cementitious applications, further improvement of this performance is desirable in many cases. Polyvinyl-alcohol-stabilized powders and dispersions are widely mentioned in the literature, for example in EP-A 1065224, EP-A 1110978, and EP-A 1110979. In order, first to increase the water resistance of the resultant products, and second, to increase the stability of the dispersions, WO-A 99/16794, for example, describes the use of polyvinyl alcohols hydrophobicized with VeoVa10®. Although these polyvinyl alcohols provide excellent stabilization, they have only very little effect on the water resistance of the resultant products, because, with respect to water-solubility, the degree of modification is very low.

Other attempts to improve the properties mentioned have been based, for example, on water-soluble polyvinyl acetals. These are obtained by reacting polyvinyl alcohol with aldehydes. A problem with these polymers is the fact that some of them have very low cloud points and therefore have only limited use, or cannot be used at all in the polymerization process. The hydrophobicizing properties of these polymers are good, but the stabilizing action is only moderate. Polyvinyl acetal protective colloids are described in EP-A 834520.

EP-A 1088835 describes the use of water-soluble, fully hydrolyzed ethylene-containing polyvinyl alcohols as protective colloids in the polymerization process. The fully hydrolyzed products described lead to binders with good adhesive properties for the adhesive-bonding of wood, in particular improved water resistance of the adhesive bond. However, these products are not suitable for preparing dispersion powders, because the water resistance has been increased to the extent that the powder no longer redisperses.

SUMMARY OF THE INVENTION

It was therefore an object of the invention to provide dispersions and corresponding water-redispersible dispersion powders, based on monomers from the group of the vinyl esters, vinyl chloride, ethylene, styrene, (meth)acrylic esters and, where appropriate, other monomers, which when used in cementitious applications, have improved viscosity stability and cement stability, respectively, which do not inhibit the setting of cement, and which provide greater water resistance in the resultant products.

DETAILED DESCRIPTION OF THE PREFERRED EMBODIMENT(S)

The invention provides protective-colloid-stabilized polymers in the form of their aqueous dispersions or of their water-redispersible powders, based on homo- or copolymers of one or more monomers from the group consisting of vinyl esters of unbranched or branched alkyl carboxylic acids having from 1 to 15 carbon atoms, methacrylic esters and acrylic esters of alcohols having from 1 to 15 carbon atoms, vinylaromatics, olefins, dienes, and vinyl halides, wherein partially hydrolyzed vinyl acetate-ethylene copolymers are present as protective colloids, with an ethylene content of from 1 to 15 mol %, with a degree of hydrolysis DH of the vinyl acetate units of 80 mol % $\leqq$ DH<95 mol %, and with a Höppler viscosity, in 4% strength aqueous solution, of from 2 to 30 mPas (Höppler method at 20° C., DIN 53015).

In preferred embodiments, the Höppler viscosity is from 3 to 25 mPas, and the degree of hydrolysis DH is from 85 to 90 mol %. The ethylene content is preferably from 1 to 5 mol %. The protective colloid content in dispersions and powders is in each case from 3 to 30% by weight, preferably from 5 to 20% by weight, based in each case on the base polymer. The protective colloids used are generally water-soluble.

The protective colloids may be prepared by known processes for polyvinyl alcohol preparation. The polymerization process is preferably carried out in organic solvents at an elevated temperature, using peroxides as a polymerization initiator. Solvents used are preferably alcohols such as methanol or propanol. The ethylene content of the polymer may be controlled by means of the ethylene pressure. The resultant vinyl acetate-ethylene copolymer is preferably not isolated, but directly subjected to hydrolysis. The hydrolysis may take place by known processes, for example by using methanolic NaOH catalysis. After the hydrolysis, the solvent is replaced by water through work-up by distillation. The protective colloid is preferably not isolated but used directly in the form of an aqueous solution for the polymerization process.

Vinyl esters suitable for the base polymer are those of carboxylic acids having from 1 to 15 carbon atoms. Preferred vinyl esters are vinyl acetate, vinyl propionate, vinyl butyrate, vinyl-2-ethylhexanoate, vinyl laurate, 1-methylvinyl acetate, vinyl pivalate and vinyl esters of α-branched monocarboxylic acids having from 9 to 13 carbon atoms, examples being VeoVa9® or VeoVa10®, available from Resolution Products. Vinyl acetate is particularly preferred.

Suitable methacrylic esters or acrylic esters ("(meth) acrylic esters") are esters of unbranched or branched ("optionally branched") alcohols having from 1 to 15 carbon atoms, examples being methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A suitable vinyl halide is vinyl chloride.

Where appropriate, from 0.05 to 50% by weight, preferably from 1 to 10% by weight, based on the total weight of the base polymer, of auxiliary monomers may also be copolymerized. Examples of auxiliary monomers are ethylenically unsaturated mono- and dicarboxylic acids, preferably acrylic acid, methacrylic acid, fumaric acid, and maleic acid; ethylenically unsaturated carboxamides and carbonitriles, preferably acrylamide and acrylonitrile; mono- and diesters of fumaric acid and maleic acid, for example the diethyl and diisopropyl esters; and also maleic anhydride, and ethylenically unsaturated sulfonic acids and their salts, preferably vinyl sulfonic acid and 2-acrylamido-2-methyl-propanesulfonic acid. Other examples are pre-crosslinking comonomers, for example ethylenically polyunsaturated comonomers such as divinyl adipate, diallyl maleate, allyl methacrylate, or triallyl cyanurate, or post-crosslinking comonomers, such as acrylamidoglycolic acid (AGA), methyl methacrylamidoglycolate (MAGME), N-methylol acrylamide (NMA), N-methylolmethacrylamide (NMMA), allyl N-methylol carbamate, alkyl ethers or esters of N-methylolacrylamide, of N-methylolmethacrylamide, or of allyl N-methylolcarbamate, such as their isobutoxy ethers. Epoxyfunctional comonomers, such as glycidyl methacrylate and glycidyl acrylate, are also suitable.

Other examples are silicon-functional comonomers, such as acryloxypropyltri(alkoxy)- and methacryloxypropyltri (alkoxy)silanes, vinyl trialkoxysilanes, and vinyl methyldialkoxysilanes, examples of alkoxy groups which may be present being methoxy, ethoxy, and ethoxypropylene glycol ether radicals. Mention may also be made of monomers having hydroxy or CO groups, e.g. hydroxyalkyl esters of methacrylic acid or of acrylic acid, e.g. hydroxyethyl, hydroxypropyl, or hydroxybutyl acrylate or methacrylate, and also of compounds such as diacetoneacrylamide and acetylacetoxyethyl acrylate or methacrylate.

Examples of suitable homo- and copolymers are vinyl acetate homopolymers; copolymers of vinyl acetate with ethylene; copolymers of vinyl acetate with ethylene and with one or more other vinyl esters; copolymers of vinyl acetate with ethylene and acrylic esters, copolymers of vinyl acetate with ethylene and vinyl chloride; styrene-acrylic ester copolymers; and styrene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more other comonomers from the group of vinyl esters having from 1 to 12 carbon atoms in the carboxylic acid radical, e.g. vinyl propionate, vinyl laurate, vinyl esters of alpha-branched carboxylic acids having from 9 to 13 carbon atoms such as VeoVa9, VeoVa10, and VeoVa11; copolymers of vinyl acetate, from 1 to 40% by weight of ethylene, and preferably from 1 to 60% by weight of acrylic ester(s) of unbranched or branched alcohols having from 1 to 15 carbon atoms, in particular N-butyl acrylate or 2-ethylhexyl acrylate; and copolymers using from 30 to 75% by weight of vinyl acetate, from 1 to 30% by weight of vinyl laurate or vinyl esters of an alpha-branched carboxylic acid having from 9 to 11 carbon atoms, and also from 1 to 30% by weight of acrylic esters of unbranched or branched alcohols having from 1 to 15 carbon atoms, in particular n-butyl acrylate or 2-ethyl hexyl acrylate, where these also contain from 1 to 40% by weight of ethylene; and copolymers using vinyl acetate, from 1 to 40% by weight of ethylene, and from 1 to 60% by weight of vinyl chloride; where the polymers may also contain the amounts mentioned of the auxiliary monomers mentioned, the percentage by weight in each case totaling 100% by weight.

Preference is also given to copolymers of n-butyl acrylate or 2-ethylhexyl acrylate, or copolymers of methyl methacrylate with n-butyl acrylate and/or 2-ethylhexyl acrylate; styrene-acrylic ester copolymers using one or more monomers from among methyl acrylate, ethyl acrylate, propyl acrylate, n-butyl acrylate, and 2-ethylhexyl acrylate; vinyl acetate-acrylic ester copolymers using one or more monomers from the group of methyl acrylate, ethyl acrylate, propyl acrylate, n-butyl acrylate, 2-ethylhexyl acrylate, and, where appropriate, ethylene; and styrene-1,3-butadiene copolymers; where the polymers may also contain auxiliary monomers, and the percentages by weight totals 100%.

The selection of monomer or the selection of the parts by weight of the comonomers is preferably such that the resultant glass transition temperature Tg is from −50° C. to +50° C., more preferably from −30° C. to +40° C. The glass transition temperature Tg of the polymers may be determined in a known manner by differential scanning calorimetry (DSC). The Fox equation may also be used for an approximate preliminary calculation of Tg. According to T. G. Fox, BULL. AM. PHYSICS SOC. 1, 3, page 123 (1956): $1/Tg = x_1/Tg_1 + x_2/Tg_2 + \ldots + x_n/Tg_n$, where $x_n$ is the fraction by weight (% by weight/100) of the monomer n, and $Tg_n$ is the glass transition temperature in Kelvin of the homopolymer of the monomer n. Tg values for homopolymers are listed in POLYMER HANDBOOK 2nd Edition, J. Wiley & Sons, New York (1975).

The base polymers are prepared by the emulsion polymerization process or by the suspension polymerization process, preferably by the emulsion polymerization process, the polymerization temperature generally being from 40 to 100° C., preferably from 60 to 80° C. In the case of the copolymerization of gaseous comonomers such as ethylene, 1,3-butadiene, or vinyl chloride, operation may also be carried out at superatmospheric pressure, generally at from 5 to 100 bar.

The polymerization is initiated using water-soluble or monomer-soluble initiators or redox-initiator combinations, these being those commonly used for emulsion polymerization and suspension polymerization, respectively. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators generally used is from 0.01 to 0.5% by weight, based on the total weight of the monomers.

Redox initiators include combinations of the initiators previously mentioned with reducing agents. Suitable reducing agents are the sulfites and bisulfites of the alkali metals and of ammonium, for example sodium sulfite, the derivatives of sulfoxylic acid, for example zinc formaldehyde sulfoxylates or alkali metal formaldehyde sulfoxylates, an example being sodium hydroxymethanesulfinate, and ascorbic acid. The amount of reducing agent is preferably from 0.01 to 0.5% by weight, based on the total weight of the monomers.

To control molecular weight, regulating substances may be used during the polymerization process. If regulators are used, the amounts usually used of these are generally from 0.01 to 5.0% by weight, based on the weight of the monomers to be polymerized, and they may be fed separately and/or after premixing with components for the reaction. Examples of these substances are n-dodecyl mercaptan, tert-dodecyl mercaptan, mercaptopropionic acid, methyl mercaptopropionate, isopropanol, and acetaldehyde. It is preferable not to use any regulating substances.

In addition to the partially hydrolyzed vinyl acetate-ethylene copolymers, use may be made of other protective colloids, such as polyvinyl alcohols. The polymerization preferably takes place without other protective colloids.

The total amount of the partially hydrolyzed vinyl acetate-ethylene copolymers generally added during the polymerization process is from 1 to 20% by weight, based on the total weight of the monomers. All of the protective colloid content may form an initial charge, or else a portion may form an initial charge and a portion may form a feed. At least 5% by weight of the protective colloid preferably forms an initial charge, and all of the protective colloid content most preferably forms an initial charge.

The polymerization process preferably takes place without addition of emulsifiers. In exceptional cases, it can also be advantageous to make additional use of small amounts of emulsifiers, where appropriate from 1 to 5% by weight, based on the amount of monomer. Suitable emulsifiers include anionic, cationic, and non-ionic emulsifiers, for example anionic surfactants such as alkyl sulfates whose chain length is from 8 to 18 carbon atoms, or alkyl or alkyl aryl ether sulfates having from 8 to 18 carbon atoms in the hydrophobic radical and up to 40 ethylene or propylene oxide units, alkyl- or alkylarylsulfonates having from 8 to 18 carbon atoms, esters and half esters of sulfosuccinic acid with monohydric alcohols or with alkylphenols, or non-ionic surfactants such as alkyl polyglycol ethers or alkylarylpolyglycol ethers having from 8 to 40 ethylene oxide units. All of the monomers may form an initial charge, or all of the monomers may form a feed, or portions of the monomers may form an initial charge and the remainder may form a feed after the polymerization has been initiated. The procedure is preferably that from 50 to 100% by weight, based on the total weight of the monomers, form an initial charge and the remainder forms a feed. The feeds may be separate (spatially and chronologically), or all or some of the components to be fed may be fed after preemulsification.

All or a portion of the auxiliary monomers may likewise form an initial charge or form a feed, depending on their chemical nature. In the case of vinyl acetate polymerization processes, the auxiliary monomers may form a feed or may form an initial charge, depending on their copolymerization parameters. For example, acrylic acid derivatives may form a feed, whereas vinyl sulfonate may form an initial charge.

Monomer conversion is controlled by the addition of initiator. It is preferable for all of the initiators to form a feed.

Once the polymerization process has ended, post-polymerization may be carried out using known methods to remove residual monomer, one example of a suitable method being post-polymerization initiated by a redox catalyst. Volatile residual monomers may also be removed by distillation, preferably at subatmospheric pressure, and, where appropriate, by passing inert entraining gases, such as air, nitrogen, or water vapor, through or over the material.

The solids content of the resultant aqueous dispersions is generally from 30 to 75% by weight, preferably from 50 to 60% by weight. To prepare water-redispersible polymer powders, the aqueous dispersions are dried, for example by fluidized-bed drying, freeze drying, or spray drying, where appropriate after addition of protective colloids as a spraying aid. The dispersions are preferably spray dried. The spray drying takes place in conventional spray drying systems, and the atomization can use single-, twin- or multifluid nozzles, or use a rotating disk. The discharge temperature is generally selected within the range from 45 to 120° C., preferably from 60 to 90° C., depending on the system, the Tg of the resin, and the desired degree of drying.

The total amount of the spraying aid used is generally from 3 to 30% by weight, based on the polymeric constituents of the dispersion. This means that the total amount of protective colloid used prior to the drying procedure is to be at least from 3 to 30% by weight, based on the polymer content, preferably from 5 to 20% by weight, based on the polymer content. Preferred spraying aids are the inventive water-soluble polyvinyl alcohols containing ethylene groups.

Other suitable spraying aids are partially hydrolyzed polyvinyl alcohols; polyvinylpyrrolidones; polysaccharides in water-soluble form, e.g. starches such as amyloses and amylopectin, celluloses and their carboxymethyl, methyl, hydroxyethyl, hydroxypropyl derivatives; proteins such as casein or caseinate, soy protein, and gelatins; ligninsulfonates; synthetic polymers such as poly(meth)acrylic acid, copolymers of (meth)acrylates with carboxy-functional comonomer units, poly(meth)acrylamide, polyvinylsulfonic acids and their water-soluble copolymers; melamine-formaldehydesulfonates, naphthalene-formaldehyde sulfonates, styrene-maleic acid copolymers, and vinyl ether-maleic acid copolymers. It is preferable for no protective colloids other than polyvinyl alcohols to be used as spraying aids.

A content of up to 1.5% by weight of antifoam, based on the base polymer, has often been found advantageous during the spraying process. In order to increase storage stability by improving resistance to blocking, in particular in the case of powders with a low glass transition temperature, the resultant powder may be provided with an antiblocking agent (anticaking agent), preferably up to 30% by weight, based on the total weight of polymeric constituents. Examples of antiblocking agents are calcium carbonate, magnesium carbonate, talc, gypsum, silica, kaolins, silicates whose particle sizes are preferably in the range from 10 nm to 10 μm.

The viscosity of the feed material to be sprayed is adjusted by way of the solids content in such a way as to give a value of less than 500 mPas (Brookfield viscosity at 20 rpm and 23° C.), preferably less than 250 mPas. The solids content of the dispersion to be sprayed is greater than 35%, preferably greater than 40%.

To improve performance-related properties, other additives may be added during the spraying process. Examples of other constituents present in preferred embodiments of dispersion powder compositions are pigments, fillers, foam stabilizers, hydrophobicizing agents.

The aqueous polymer dispersions and the water-redispersible, protective-colloid-stabilized polymer powders may be used in the application sectors typical for these, for example in construction chemistry products in association with hydraulically setting binders, examples being cements (Portland cement, alumina cement, pozzolanic cement, slag cement, magnesia cement, or phosphate cement), gypsum, waterglass, or for the production of construction adhesives, of plasters or renderings, of trowelling compositions, of floor-filling compositions, of sealing slurries, of jointing mortars, or of paints, or as sole binders for coating compositions or adhesives, or as compositions for the coating or binding of textiles or paper.

The examples below serve for further illustration of the invention:

EXAMPLES

Protective Colloid 1:
Ethylene-containing polyvinyl alcohol having 8 mol % of ethylene units, a Höppler viscosity of 3.9 mPas, and a hydrolysis number of 150.
Protective Colloid 2:
Ethylene-containing polyvinyl alcohol having 8 mol % of ethylene units, a Höppler viscosity of 2.8 mPas, and a hydrolysis number of 157.
Protective Colloid 3:
Ethylene-containing polyvinyl alcohol having 8 mol % of ethylene units, a Höppler viscosity of 4.2 mPas, and a hydrolysis number of 121.
Protective Colloid 4:
Ethylene-containing polyvinyl alcohol having 8 mol % of ethylene units, a Höppler viscosity of 3.4 mPas, and a hydrolysis number of 111.
Protective Colloid 5:
Ethylene-containing polyvinyl alcohol having 8 mol % of ethylene units, a Höppler viscosity of 20.1 mPas, and a hydrolysis number of 136.
Protective Colloid 6:
Polyvinyl alcohol with a Höppler viscosity of 4 mPas and a hydrolysis number of 140.
Protective Colloid 7:
Polyvinyl alcohol with a Höppler viscosity of 25 mPas and a hydrolysis number of 140.

Inventive Example 1

Emulsion polymerization with protective colloid 1:
1170 g of water, 728 g of protective colloid 1 (21.6% by weight solution), and 1930 g of vinyl acetate form an initial charge in a pressure autoclave. This pre-emulsion is adjusted to a pH of 4.0 and heated to 55° C. An ethylene pressure of 18 bar is then applied to the autoclave.

To initiate the polymerization, tert-butyl hydroperoxide (TBHP, 1.5% by weight in water) and Brüggolit (2.5% by weight in water) are fed, each at 30 g/h. The temperature is held at 55° C. by cooling. 60 min after the start of the reaction, the feed of 484 g of vinyl acetate over 90 minutes and 168 g of protective colloid 1 plus 120 g of water over 120 minutes is begun. From the start of the reaction, supplementary ethylene at 38 bar is fed until the total amount is 260 g. The polymerization is then completed over a further hour, the residual gas depressurized, and the system cooled. To reduce the amount of residual monomer, postpolymerization is carried out using 10 g of TBHP (10% strength) and 20 g of Brüggolit (5% strength).

The solids content of the dispersion is 55.5%, its pH is 4.0, and its viscosity is 390 mPas.

Inventive Example 2

Emulsion polymerization with protective colloid 2:
Using a method similar to that of Example 1, a dispersion with protective colloid 2 (solids content 20.0%) is prepared.
The solids content of the dispersion is 54.7%, its pH is 4.2, and its viscosity is 600 mPas.

Inventive Example 3

Emulsion polymerization with protective colloid 3:
Using a method similar to that of Example 1, a dispersion with protective colloid 3 is prepared.
The solids content of the dispersion is 51.1%, its pH is 4.5, and its viscosity is 60 mPas.

Inventive Example 4

Emulsion polymerization with protective colloid 4:
Using a method similar to that of Example 1, a dispersion with protective colloid 4 is prepared.
The solids content of the dispersion is 52.0%, its pH is 4.2 and its viscosity is 350 mPas.

Inventive Example 5

Emulsion polymerization with protective colloids 1 and 5:
Using a method similar to that of Example 1, a dispersion with protective colloids 1 and 5 is prepared, replacing 20% by weight of protective colloid 1 in Example 1 by protective colloid 5.
The solids content of the dispersion is 51.5%, its pH is 4.3, and its viscosity is 450 mPas.

Comparative Example 6

Emulsion polymerization with protective colloid 6:
Using a method similar to that of Example 6, a dispersion with protective colloid 6 is prepared.
The solids content of the dispersion is 55.0%, its pH is 4.1, and its viscosity is 400 mPas.

Comparative Example 7

Emulsion polymerization with protective colloids 6 and 7:
Using a method similar to that of Example 5, a dispersion with protective colloids 6 and 7 is prepared, instead of protective colloids 1 and 5.
The solids content of the dispersion is 51.0%, its pH is 4.0, and its viscosity is 1100 mPas.

Determination of Cement Stability:
A cement mixture is prepared with the following formulation:

| | |
|---|---|
| Portland cement | 82.5 g |
| Calcite (CaCO$_3$) 10 - 40 mm | 75.0 g |
| Quartz sand 200 - 500 mm | 142.0 g |
| Dispersion | 29.0 g |
| Water | 85.0 g |

The viscosity of this mixture is determined directly after preparation ($T_0$) and after 60 min ($T_{60}$).

The quotient $T_{60}/T_0$ is a measure of the increase in viscosity, and of cement stability. The value is multiplied by 100 and given as a percentage.

The test results are given in Table 1.

TABLE 1

| Example | Cement Stability (%) |
|---|---|
| Inventive Example 1 | 115 |
| Inventive Example 2 | 71 |
| Inventive Example 3 | 143 |
| Inventive Example 4 | 95 |
| Inventive Example 5 | 90 |
| Comparative Example 6 | 175 |
| Comparative Example 7 | 160 |

The invention always gives dispersions with improved cement stability. Cement stability is better than for comparable polyvinyl alcohol-stabilized dispersions used hitherto.

Powder Preparation:

The dispersion from Example 4 is sprayed in a known manner after addition of 12% by weight (solids/solids) of protective colloid 3, to give a powder (powder 1).

Using a similar method, a second powder is prepared with addition of 10% by weight of protective colloid 3 and 2% by weight (solids/solids) of a polyvinyl alcohol whose degree of hydrolysis is 88 mol % and whose Höppler viscosity is 13 mPas (powder 2).

For comparison, a powder is prepared from comparative dispersion 6 and 12% by weight of protective colloid 6 (powder 3).

The resultant powders 1 and 2 have good flowability, good redispersibility, and are resistant to blocking, and their property profile, other than improved cement stability, is comparable with that of the polyvinyl-alcohol-stabilized powder 3.

Tensile bond strengths in tile adhesive are tested in the following formulation (6% by weight polymer content):

| | |
|---|---|
| Quartz sand | 586 parts |
| Portland cement | 350 parts |
| Cellulose | 4 parts |
| Dispersion powder | 60 parts |

The tensile bond strengths are determined after storage under 4 conditions:

| | |
|---|---|
| 28D: | 28 days of dry storage |
| 7D/21W: | 7 days of dry storage/21 days of wet storage |
| 14D/14DC + 70° C./1D: | 14 days of dry storage/14 days of storage at 70° C., 1 day of dry storage |
| Freeze-thaw cycle: | Freeze-thaw cycle storage |

The results are given in Table 2:

TABLE 2

| | 28D (N/mm$^2$) | 7D/21W (N/mm$^2$) | 14D/14DC + 70/1D (N/mm$^2$) | Freeze-thaw cycle (N/mm$^2$) |
|---|---|---|---|---|
| Powder 1 | 1.45 | 1.20 | 1.55 | 1.22 |
| Powder 2 | 1.35 | 1.10 | 1.40 | 1.28 |
| Powder 3 | 1.30 | 0.95 | 1.45 | 1.12 |

In particular after wet storage and freeze-thaw cycle storage, the polymer powders stabilized with partially hydrolyzed vinyl acetate-ethylene copolymers give better tensile bond strength values than the standard powder 3, which has been stabilized with polyvinyl alcohol.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of a protective-colloid-stabilized base polymer in the form of a water-redispersible powder, said polymer comprising a homo- or copolymer of one or more monomers selected from the group consisting of vinyl esters of optionally branched alkyl carboxylic acids having from 1 to 15 carbon atoms, (meth)acrylic esters of alcohols having from 1 to 15 carbon atoms, vinylaromatics, olefins, dienes, and vinyl halides wherein said polymer is prepared by emulsion polymerization or suspension polymerization in the presence of a protective-colloid and drying of the polymer dispersion thus obtained after addition of further protective colloid, wherein partially hydrolyzed vinyl acetate-ethylene copolymers with an ethylene content of from 1 to 15 mol %, with a degree of hydrolysis DH of the vinyl acetate units of 80 mol %<DH<95 mol %, and with a Höppler viscosity, in 4% by weight aqueous solution, of from 2 to 30 mPas, as measured by the Höppler method at 20° C., according to DIN 53015, are used as protective colloids.

2. The process of claim 1, wherein the degree of hydrolysis DH of the partially hydrolyzed vinyl acetate-ethylene copolymers is from 85 to 90 mol %.

3. The process of claim 1, wherein the ethylene content of the partially hydrolyzed vinyl acetate-ethylene copolymers is from 1 to 5 mol %.

4. The process of claim 2, wherein the ethylene content of the partially hydrolyzed vinyl acetate-ethylene copolymers is from 1 to 5 mol %.

5. The process of claim 1, wherein the protective colloid content is from 3 to 30% by weight, based on the base polymer.

6. The process of claim 2, wherein the protective colloid content is from 3 to 30% by weight, based on the base polymer.

7. The process of claim 3, wherein the protective colloid content is from 3 to 30% by weight, based on the base polymer.

8. The process of claim 4, wherein the protective colloid content is from 3 to 30% by weight, based on the base polymer.

9. The process of claim 1, wherein the selection of monomer and the selection of the parts by weight of any comonomers for the base polymer is such that the base polymer has a glass transition temperature Tg of from −50° C. to +50° C.

10. The process of claim 1, wherein from 0.05 to 50% by weight, based on the total weight of the base polymer, of auxiliary monomers are also copolymerized.

11. A process for preparing the protective-colloid-stabilized base polymer of claim 1, comprising polymerizing by an emulsion polymerization process where partially hydrolyzed vinylacetate-ethylene copolymers are the sole protective colloids employed.

12. In a formulation comprising an inorganic, hydraulically setting binder and a protective-colloid-stabilized polymer, the improvement comprising selecting as at least one protective-colloid-stabilized polymer, a protective colloid stabilized polymer prepared by the process of claim 1.

13. The formulation of claim 12, which is selected from the group consisting of construction adhesives, plasters, renders, trowelling compositions, floor-filling compositions, jointing mortars, and paints.

14. A coating composition or adhesive containing, as the sole binder, the protective-colloid-stabilized polymer prepared by the process of claim 1.

15. A composition for the coating or binding of textiles or paper containing, as the sole binder, the protective-colloid-stabilized polymer prepared by the process of claim 1.

* * * * *